UNITED STATES PATENT OFFICE.

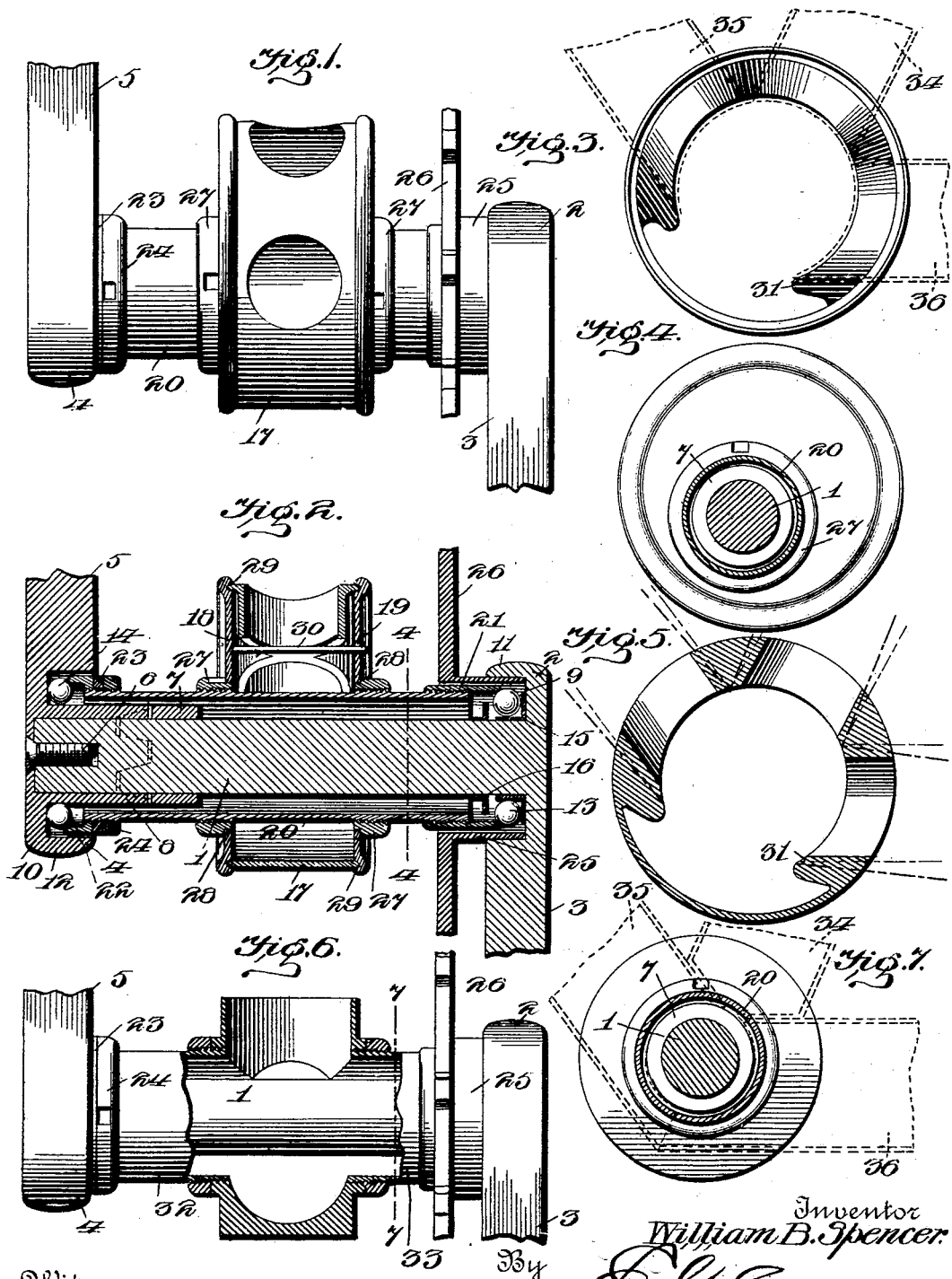

WILLIAM BARTON SPENCER, OF CHICAGO, ILLINOIS.

CRANK-HANGER.

SPECIFICATION forming part of Letters Patent No. 704,138, dated July 8, 1902.

Application filed September 19, 1900. Serial No. 30,495. (No model.)

*To all whom it may concern:*

Be it known that I, WILLIAM BARTON SPENCER, a citizen of the United States, residing at Chicago, in the county of Cook and State of Illinois, have invented a new and useful Crank-Hanger, of which the following is a specification.

My present invention relates to improvements in the crank hanger and bearing of bicycles or similar vehicles, and has for its object to provide novel mechanism for supporting and adjusting the crank-shaft both laterally and longitudinally for the purpose of taking up the chain-slack and for the additional purpose of accurately positioning the pedals with respect to the frame.

To the accomplishment of the several objects stated and others subordinate thereto the invention consists in the construction and arrangement of parts to be hereinafter described, and illustrated in the accompanying drawings.

In said drawings, Figure 1 is a side elevation of my improved crank-hanger and adjacent parts. Fig. 2 is a sectional view of the subject-matter of Fig. 1. Fig. 3 is a side elevation of the hanger-band detached with the front and rear reaches and the seat-post tube indicated in dotted lines. Fig. 4 is a sectional view on the line 4 4 of Fig. 2. Fig. 5 is a sectional view of the rough casting from which the hanger-band is formed and showing by means of dot-and-dash lines the manner in which the openings are reamed out for the purpose of inserting frame-tubes at the desired angles. Fig. 6 is a sectional elevation of a modified form of my invention, in which the hanger-sleeve is disposed concentric with the band and is constructed in two end sections screwed into the hanger-heads and retained by lock-nuts; and Fig. 7 is a sectional view on the line 7 7 of Fig. 6, illustrating in dotted lines the manner in which the frame-tubes are passed into the hanger and interlocked in the modified construction.

Referring to the numerals of reference employed to designate corresponding parts throughout the views, 1 indicates the driving-shaft of a bicycle or other vehicle, preferably formed integral with and extending laterally from the center of the hub 2 of a pedal-crank 3. The end of the crank-shaft 1 opposite the hub 2 is passed into an axial recess in the hub 4 of the opposing pedal-crank 5 and is secured by means of a tap-screw 6, passing through the wall of the hub and into the end of the shaft, for the purpose of drawing a clutch-collar 7, fixed upon the shaft, into engagement with a clutch-sleeve 8, extending from the hub 4 and closely surrounding the shaft 1. By means of this connection between the shaft and pedal-crank 5 all torsional strain between the parts is overcome and at the same time their disassociation may be quickly effected by the removal of the screw 6 and the endwise withdrawal of the driving-shaft.

It is obviously desirable to bring the bearings of the crank-shaft as near as possible to the planes of rotation of the cranks, and to effect this end and for the purpose of utilizing the hubs 2 and 4 as housings I provide said hubs with annular recesses 9 and 10 concentric with the axis of the shaft 1, the recess 9 immediately encircling the shaft and the recess 10 being disposed in similar relation to the sleeve 8. These recesses define the circular or peripheral hub-flanges 11 and 12, which encircle the ball-bearings 13 and 14 of the shaft. Inasmuch as it may not be desirable to case-harden the surfaces of the shaft, sleeve, and hubs against which the bearing-balls move, I preferably seat hard-steel wear-rings 15 of angular form at the junctures of the peripheries of the shaft and sleeve with the bottom walls of the recesses 9 and 10 and provide similar keeper-rings 16, encircling the shaft and sleeve, respectively, for the purpose of confining the balls within the recesses when the parts are removed from the crank-hanger.

As is well understood in the art, the crank-hanger is that portion of a bicycle which serves to connect the lower convergent ends of the front and rear reaches and the seat-post tube of the frame and which receives and supports the crank-shaft and its connected mechanism. In accordance with my present invention the crank-hanger comprehends what may be termed the "hanger-band" 17, a pair of "hanger-heads" 18 and 19 at opposite sides of the band, and a "hanger-sleeve" 20, which in the preferred embodiment of the invention is continuous and pierces the heads to have its opposite ends disposed, respectively, within the recess 10 of the hub 4 and adjacent to and opposite the recess 9 in the hub 2. The ends of the hanger-sleeve 20 are externally threaded for the reception of internally-threaded adjustable bearing-collars 21 and 22, which extend beyond the ends of the sleeve into contact with the bearing-balls, the outer end edges of these collars being transversely curved in order to minimize the frictional contact of the balls therewith. Ordinarily only one of the bearing-collars is required to be adjusted in order to effect the adjustment of the bearings, and I therefore mount a lock-nut 23 in the rear of the collar 22 and an annular jam-nut 24 behind the lock-nut for the purpose of jamming the latter or of releasing it, as is necessary to the retention of the collar 22 or to its regulation, as the case may be.

It will be noted that the diameter of the collar 22 is slightly in excess of that of the collar 21, this variation being made necessary in order, first, to accommodate the sleeve 8, which is located at only one end of the shaft, and, second, to secure a neat uniform appearance of the structure by making the diameter of the collar 22 equal to the external diameter of the sprocket-sleeve 25, which extends laterally from the driving-sprocket 26 and is brazed against the inner face of the annular flange 11 of the hub 2, it being observed that the sleeve 25 and sprocket encircle and constitute a protection for the collar 21, as best seen in Fig. 2 of the drawings.

I have now completed the description of the construction and arrangement of the crank-shaft and its bearings, and I shall now proceed to a description of those peculiarities of the crank-hanger which make possible the eccentric shifting of the shaft for the purpose of taking up or creating chain-slack as desired.

The hanger-sleeve 20 pierces the heads eccentrically and is secured therein by means of locking-rings 27, screwed upon the sleeve and carrying at their inner edges the heads 18 and 19, which latter are opposed to annular shoulders 28, formed on the rings 27, so that as the latter is screwed upon the sleeve by the manipulation of a spanner or other suitable tool the heads 18 and 19 will be clamped rigidly against the opposite edges of the hanger-band 17, said edges being received within the concavities of opposed peripheral beads 29, formed upon the heads. Whenever it is desired to shift the crank for the purpose of regulating the chain-slack, one or both of the heads may be loosened by unscrewing one or both of the locking-rings. The heads are then turned to the desired extent and are reclamped against the hanger-band. In like manner, if it is desired to shift the sleeve and crank endwise for the purpose of throwing the driving-sprocket 26 into accurate alinement with the rear sprocket the locking-collars are advanced in one direction or the other upon the hanger-sleeve 20, which effects the relative rearrangement of the sprocket and crank-hanger to the accomplishment of the desired end.

In order to insure the synchronous rotation of the hanger-heads without preventing such separation thereof as may be necessary to effect their release, I extend a guide-bolt 30 from the head 18 and pass its outer end through an opening in the head 19, as shown.

I have stated that the frame-tubes are designed to be passed into the hanger-band and interlocked upon the interior thereof. This feature of the construction is opposed to the ordinary mounting of the tubes upon hollow projections extending outwardly from the band and comprehends the casting upon the interior of the band 7 of a segmental reinforce 31. (Shown in elevation in Fig. 3 and in section in Fig. 5.) The latter figure shows the casting before finishing, and the dot-and-dash lines indicated on said figure are designed to show the manner in which the tube-openings may be reamed out at the desired angle in order that a standard casting may be employed for frames in which the tubing is arranged at relative angles varying somewhat in accordance with certain conditions which are well understood in the art and need not, therefore, be discussed at length. The hanger-band, as shown in Fig. 3, has been finished and the tubes inserted through the band and reinforce and having their inner ends in contact and connected in any suitable manner—as, for instance, by brazing. The inner extremities of the tubes are of course cut away, as shown in Fig. 3, for the purpose of providing an unobstructed path accommodating the shifting of the hanger-sleeve as the heads are rotated on the band.

In Figs. 6 and 7 I have illustrated a modified construction, the variation being that the hanger-heads are made integral with the band and are pierced concentrically by the inner ends of a pair of hanger-sleeve sections 32 and 33. In this form of the device the reinforce 31 may be omitted and the inner ends of the tubes extended nearer the axis of the hanger and interlocked, as shown in dotted lines in Fig. 7. A distinguishing peculiarity of the tube-mounting in both forms of the invention is that while the seat-post tube 34 is disposed in true radial relation to the axis of the band the front and rear reaches 35 and 36 are arranged off center or eccentric to the band in order to bring the point of intersection of the axes of the several tubes eccentric to the axis of the hanger. This relation of the parts is desirable for the reason that the center of strain is located at a point below the axis of the band and is therefore nearer the axis of the eccentrically-located hanger-shaft than would be possible if the tubes were all arranged in radial relation to the band.

From the foregoing it will appear that I have produced a novel construction of crank-hanger which permits considerable decrease of the usual diameter of the parts and is conducive to great lightness and neatness of appearance without a proportionate decrease of rigidity and durability of the structure; but while the present embodiment of my invention is believed at this time to be preferable I do not wish to limit myself to the structural details defined, as, on the contrary, I reserve the right to effect such changes, modifications, and variations as may come properly within the scope of the protection prayed.

What I claim is—

1. The combination with a hanger-band and separate heads, of a hanger-sleeve piercing the heads eccentrically and capable of endwise adjustment, and locking-rings screwed upon the sleeve and clamping against the outer faces of the heads to retain the sleeve in its adjusted positions and to retain the heads in place.

2. The combination with a hanger-band and heads provided with openings and with annular concavities receiving the opposite edges of the band and openings, of internally-threaded locking-rings extended into the openings of the heads and having shoulders opposed thereto, and a hanger-sleeve piercing the heads and externally threaded for engagement with the locking-rings, and a bolt extending from one head and loosely engaging the other to maintain their proper relative positions.

3. The combination with a hanger-band frame-tubes connected thereto and heads adjustable with respect to the band, of a hanger-sleeve connected to the heads for endwise adjustment, independent of the heads and located at a point eccentric to said heads.

4. The combination with a hanger-band and movable heads, of a hanger-sleeve piercing the heads eccentrically and capable of endwise adjustment independent thereof, and means for retaining the heads in its endwise adjusted position and for retaining the sleeve in fixed relation to the heads.

5. The combination with a hanger-band and heads, of a hanger-sleeve piercing the heads eccentrically and capable of endwise adjustment, and locking means screwed upon the sleeve and clamping the heads to retain said heads in fixed relation to the band and to retain the sleeve in fixed relation to the heads.

6. The combination with a crank-hanger comprising a band, heads disposed against the opposite edges of the band and capable of rotary movement, means for compelling the heads to move in unison, an endwise-adjustable hanger-sleeve piercing the heads eccentrically, and locking-rings clamping said heads.

7. The combination with a hanger-band and heads provided with eccentric openings and with annular cavities receiving the opposite edges of the band, of internally-threaded locking-rings extended into the openings of the heads and having shoulders opposed thereto, a hanger-sleeve piercing the heads and externally threaded for engagement with the locking-rings, and a bolt extending from one head and loosely engaging the other to maintain their proper relative positions.

8. The combination with a hanger-band, frame-tubes connected thereto, and adjustable heads opposed to the opposite edges of the band and provided with eccentric openings, of a hanger-sleeve extended through the eccentric opening in the head, and locking-rings screwed upon the sleeve beyond the heads and bearing against the same, whereby said rings perform the dual function of means for adjustably retaining the sleeve in the heads and for adjustably retaining the heads in contact with the hanger-band.

In testimony that I claim the foregoing as my own I have hereto affixed my signature in the presence of two witnesses.

WILLIAM BARTON SPENCER.

Witnesses:
JOHN H. SIGGERS,
COLUMBIA WOOD.